(12) United States Patent
Nozaki

(10) Patent No.: US 7,453,652 B2
(45) Date of Patent: Nov. 18, 2008

(54) MEMBER SWITCHING APPARATUS, LENS SWITCHING APPARATUS, LASER REPAIR APPARATUS, AND LASER INSPECTION APPARATUS

(75) Inventor: Masakazu Nozaki, Kanagawa (JP)

(73) Assignee: Laserfront Technologies, Inc., Kanagawa (JP)

( * ) Notice: Subject to any disclaimer, the term of this patent is extended or adjusted under 35 U.S.C. 154(b) by 185 days.

(21) Appl. No.: 11/326,285

(22) Filed: Jan. 6, 2006

(65) Prior Publication Data
US 2006/0164935 A1 Jul. 27, 2006

(30) Foreign Application Priority Data
Jan. 7, 2005 (JP) ............... 2005-002839

(51) Int. Cl.
*G02B 15/14* (2006.01)
(52) U.S. Cl. .................................. 359/694
(58) Field of Classification Search ......... 359/694–704, 359/814–823, 824; 396/72
See application file for complete search history.

(56) References Cited

U.S. PATENT DOCUMENTS 4,327,974 A * 5/1982 Schmidt ................ 353/27 R
5,497,272 A * 3/1996 Wun ..................... 359/821
6,301,061 B1 * 10/2001 Lin ....................... 359/726
6,590,182 B1 * 7/2003 Domae .................. 219/121.69

FOREIGN PATENT DOCUMENTS

| JP | 403180048 A | * | 8/1991 |
| JP | 4-28489 A | | 1/1992 |
| JP | 4-63411 U | | 5/1992 |
| JP | 7-35964 A | | 2/1995 |
| JP | 8-29695 A | | 2/1996 |
| JP | 9-266659 A | | 10/1997 |
| JP | 9-304682 A | | 11/1997 |
| JP | 2001-243654 A | | 9/2001 |
| JP | 2001-285855 A | | 10/2001 |
| JP | 2002-289522 A | | 10/2002 |
| JP | 2007043438 | * | 2/2007 |

* cited by examiner

*Primary Examiner*—Scott J. Sugarman
*Assistant Examiner*—Vipin M Patel
(74) *Attorney, Agent, or Firm*—Sughrue Mion, PLLC

(57) ABSTRACT

A linear motor table is provided in a lens switching apparatus of a laser repair apparatus. The linear motor table is fixed with respect to a table and a laser oscillator and moves a lens holder in a horizontal direction. Six objective lenses with magnifications different from each other are provided and are held in a lens holder in a row such that the optical axes thereof are parallel to each other. The objective lens placed in the light path of laser light is switched by the linear motor table moving the lens holder. Because of this, a member, such as a lens, can be positioned with high accuracy and if positional shifting occurs, it can be quickly cancelled using a simple mechanism.

7 Claims, 2 Drawing Sheets

MEMBER SWITCHING APPARATUS, LENS SWITCHING APPARATUS, LASER REPAIR APPARATUS, AND LASER INSPECTION APPARATUS

BACKGROUND OF THE INVENTION

1. Field of the Invention

The present invention relates to a member processing apparatus that switches a plurality of members and selects one member, a lens switching apparatus that switches lenses positioned within an optical path, as well as a laser repair apparatus and a laser inspection apparatus equipped with this lens switching apparatus.

2. Description of the Related Art

Conventionally, in manufacturing processes of semiconductor devices and liquid crystal display devices, laser repair apparatuses, which perform repairs on these devices, as well as laser inspection apparatuses, which perform inspections on these devices, have been used. For example, repairs to parts needing repair are carried out by a laser oscillator in a laser repair apparatus emitting a laser light and this laser light irradiating the parts to be repaired of semiconductor devices or liquid crystal display devices.

In this type of repair operation the magnification of the objective lens positioned in the optical path of the laser light must be switched frequently. Thereupon, a lens switching apparatus is provided between the laser oscillator and the part to be repaired in a laser repair apparatus. This lens switching apparatus is designed to select a lens with a desired magnification from among a plurality of objective lenses with magnifications different from each other and then position that lens in the optical path of the laser light. Conventionally, a rotating type switching device called a "revolver" is known as this type of lens switching apparatus (as an example refer to Japanese Patent Laid-Open Publication No. 2001-243654, in particular, to FIG. 2). A rotating type switching device switches the objective lens positioned in the optical path by mounting a plurality of objective lenses to one circular plate and rotating that circular plate.

This conventional technology has the following types of problems however. In a rotating type lens switching device, positional shifting of the lens occurs making it difficult to position the lens with high precision due to the fact that the circular plate whereon is mounted a plurality of lenses decenters. In addition, because a gear wheel is provided in the mechanism that rotates the circular plate and switches the lens, backlash occurs, making it more difficult to position the lens with high precision. The gear wheel also wears down with the passage of time, deteriorating the positioning accuracy.

Because the positional shifting of the objective lens occurs in a circular path, the mechanism to cancel this positional shifting is a very complex device. Consequently, the cost of the lens switching apparatus increases along with a considerable amount of time being required to adjust the lens position.

SUMMARY OF THE INVENTION

An object of the present invention is to provide a member switching apparatus, a lens switching apparatus, as well as a laser repair apparatus and a laser inspection apparatus which can position a member, such as a lens, with high precision and when positional shifting occurs, quickly cancel the positional shifting using a simple mechanism.

The member switching apparatus according to the present invention includes: a plurality of members which can act on an object to be worked on by being positioned at a fixed position with respect to the object to be worked on; a holder that arranges the plurality of members in a row and holds them; and a linear motor table that positions one of the members from among the plurality of members at the fixed position by moving the holder with respect to the object to be worked on in a direction in which the plurality of members are arranged.

In this invention, one member to be positioned at the fixed position mentioned above can be selected from the plurality of members by moving the holder using the linear motor table. Since the linear motor table is used at this time, it is difficult for positional shifting to occur in a direction other than the movement direction of the holder, thereby making it possible to position the member with high precision. Even if positional shifting occurs in the movement direction of the holder, the position of the member can be quickly adjusted and the positional shifting cancelled through the use of the linear motor table.

The lens switching apparatus according to the present invention is placed between a light source and an object to be worked on illuminated by light emitted from this light source and includes: a plurality of lenses; a holder that arranges the plurality of lenses in a row and holds them in a direction that intersects optical axes of the plurality of lenses such that the optical axes are parallel to each other; and a linear motor table that positions one of the lenses from among the plurality of lenses in an optical path of the light by moving the holder in a direction in which the plurality of lenses are arranged.

In the present invention, because the holder is moved by the linear motor table, it is difficult for positional shifting to occur in a direction other than the movement direction of the holder, thereby making it possible to position the lens with high precision. Even if positional shifting occurs in the movement direction of the holder, the position of the lens can be quickly adjusted and the positional shifting cancelled by driving the linear motor table.

The holder has a holder main body and a lens housing that holds the lenses and is mounted to this holder main body in a rotatable fashion. The optical axis of the lens is preferably parallel to a rotation axis of the lens housing and is separated from the rotation axis of the lens housing. Consequently, even if positional shifting occurs in the movement direction of the holder, the positional shifting can be cancelled by rotating the lens housing.

The laser repair apparatus according to the present invention repairs an object to be processed using laser light and includes: a laser oscillator; a table where an object to be processed is placed; and a lens switching apparatus placed between the laser oscillator and the object to be processed. The lens switching apparatus has a plurality of lenses, a holder that arranges the plurality of lenses in a row and holds them in a direction that intersects optical axes of the plurality of lenses such that the optical axes are parallel to each other, and a linear motor table that positions one of the lenses from among the plurality of lenses in an optical path of the light by moving the holder in a direction in which the plurality of lenses are arranged.

The laser inspection apparatus according to the present invention inspects an object to be inspected using laser light and includes: a laser oscillator; a table where an object to be inspected is placed; and a lens switching apparatus placed between the laser oscillator and the object to be inspected. The lens switching apparatus has a plurality of lenses, a holder that arranges the plurality of lenses in a row and holds them in a direction that intersects optical axes of the plurality of lenses such that the optical axes are parallel to each other, and a linear motor table that positions one of the lenses from among the plurality of lenses in an optical path of the light by moving the holder in a direction in which the plurality of lenses are arranged.

According to the present invention, because the member to be used is switched by the linear motor table moving the holder, the member can be positioned with high precision. In addition, even if positional shifting occurs in the movement direction of the holder, the positional shifting can be quickly cancelled by driving the linear motor table. Consequently, a simplified mechanism can be provided to cancel positional shifting.

DETAILED DESCRIPTION OF THE PREFERRED EMBODIMENT

Figure 1:
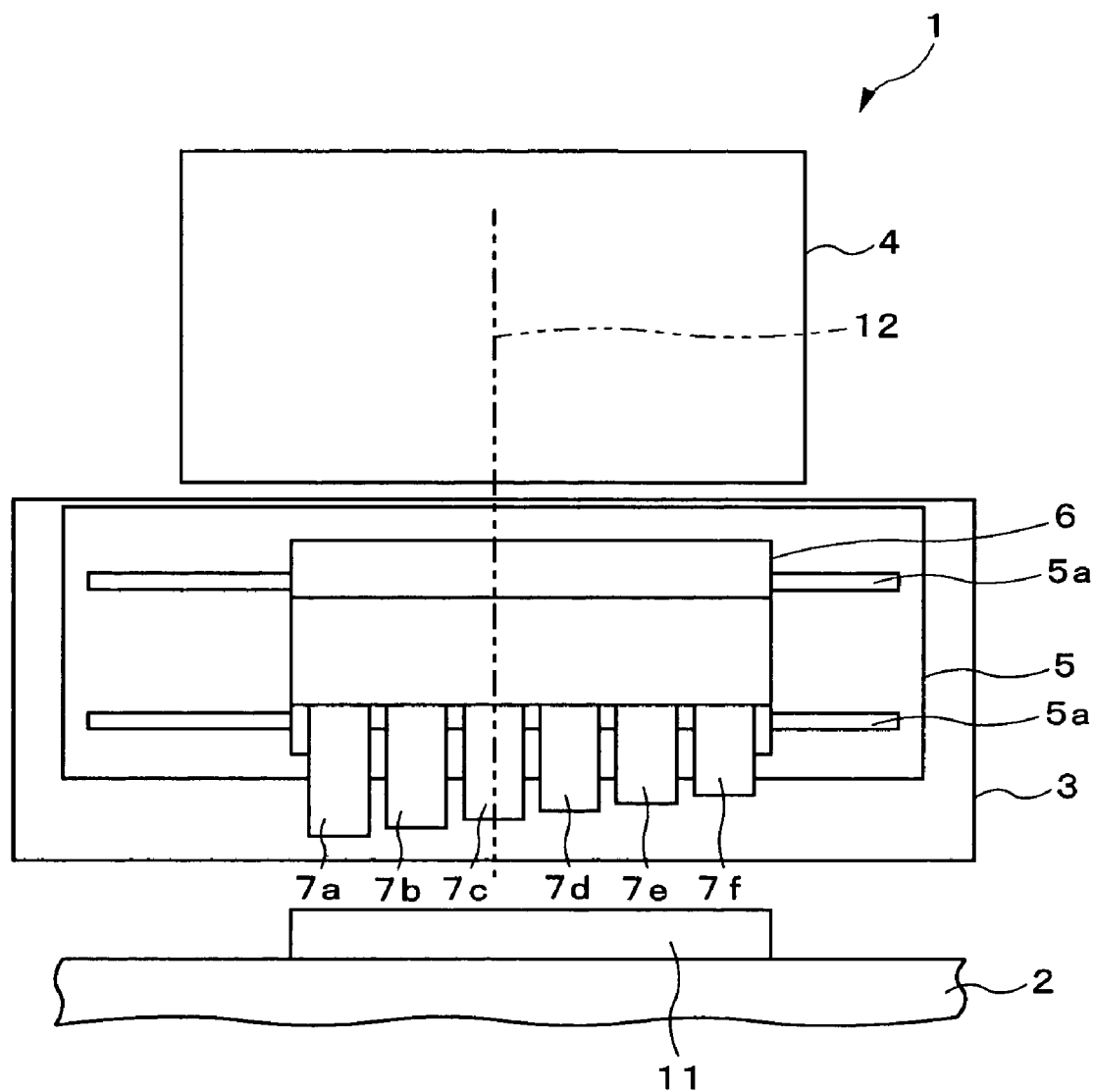
FIG. 1 is a side view showing the laser repair apparatus according to one embodiment of the present invention.
Figure 2A:
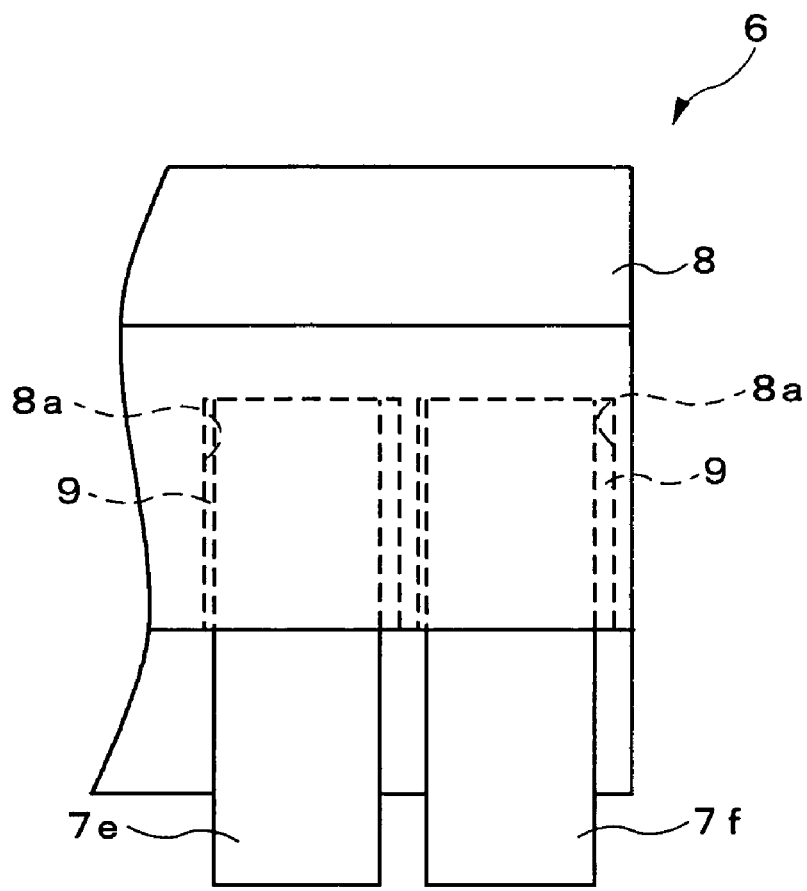
FIG. 2A is a side view showing the lens holder in the embodiment and FIG. 2B shows the lower side of the lens holder.
Figure 2B:
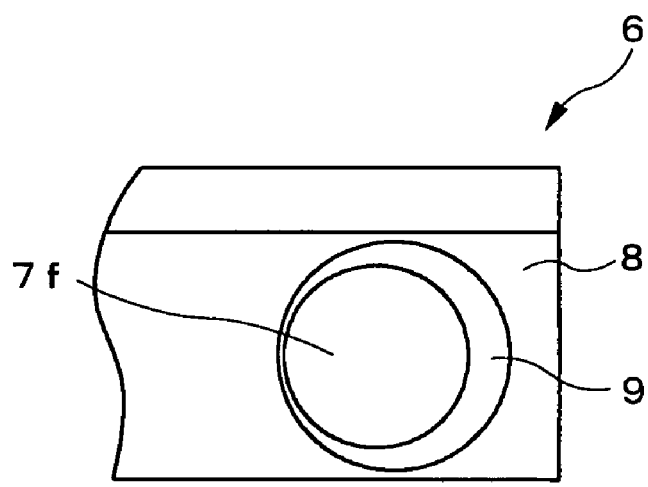

In the following, an embodiment of the present invention will be described in detail with reference to the accompanying drawings. FIG. 1 is a side view showing the laser repair apparatus according to the embodiment of the present invention. FIG. 2A is a side view showing the lens holder in the embodiment and FIG. 2B shows the lower side of the lens holder. As shown in FIG. 1, a table 2 is provided in the laser repair apparatus according to this embodiment and a work piece 11 (object to be repaired) is placed on this table 2. The work piece 11 is a semiconductor device or a liquid crystal display device being manufactured.

A lens switching apparatus 3 is provided on the table 2 and a laser oscillator 4 is provided on the lens switching apparatus 3. A laser source (not shown in figure) that emits laser light and an optical device (not shown in figure) that shapes oscillated laser light into a repaired shape are provided to the laser oscillator 4. The laser oscillator 4 directs the laser light 12 downwards or in other words, oscillates the laser light 12 towards the lens switching apparatus 3.

A linear motor table 5, fixed with respect to the table 2 and the laser oscillator 4, is provided to the lens switching apparatus 3. Two guides 5a, which extend in the horizontal direction, are provided on the linear motor table 5. The linear motor table 5 moves the lens holder 6 along the guides 5a in the horizontal direction and controls the position of the lens holder 6 in the horizontal direction. Hereinafter, the movement direction of the lens holder 6 will be referred to as the X-direction and the horizontal direction perpendicular to the X-direction will be referred to as the Y-direction. The lens holder 6 holds a plurality of, for example, objective lenses from 7a to 7f (hereinafter also referred to as objective lenses 7 collectively). The objective lenses from 7a to 7f have magnifications different from each other. The objective lenses 7 are arranged in a straight line in a row along the X-direction such that the optical axis is oriented in the vertical direction. In other words, the direction in which the objective lenses 7 are arranged is parallel to the movement direction of the lens holder 6 and is perpendicular to the optical axes of the objective lenses. One objective lens from among the objective lenses from 7a to 7f is placed in the light path of the laser light 12 by the linear motor table 5 moving the lens holder 6. The lens switching apparatus 3 holds the objective lenses 7 at a height where the position of the focal point of the objective lenses 7, placed in the light path of the laser light 12 coincides with the surface of the work piece 11.

Furthermore, as shown in FIGS. 2A and 2B, a lens holder main body 8 is provided in the lens holder 6 and six cylindrical openings 8a are formed in a row along the X-direction on the lower surface of this lens holder main body 8. In addition, each lens housing 9 is inserted into the opening 8a. The lens housing 9 has a cylindrical shape and is mounted such that it can rotate with respect to the lens holder main body 8. Rotating means (not shown in figure) that rotates the lens housing 9 with respect to the lens holder main body 8 is provided on the lens holder 6.

Each of the objective lenses 7 is housed inside the lens housing 9. The thickness of the sidewall of the lens housing 9 is not uniform and the central axis of the mounting position of the objective lens 7 is offset with respect to the central axis of the external shape of the lens housing 9. In other words, the central axis of the lens housing 9, namely the rotation axis, and the central axis of the objective lens 7 housed in the lens housing 9, namely the optical axis, are offset from each other. Both the rotation axis of the lens housing 9 and the optical axis of the objective lens 7 are extended in the vertical direction are parallel to each other.

Next, the operation of the laser repair apparatus according to the embodiment as described above will be described. At first, as shown in FIG. 1, the laser oscillator 4 oscillates the laser light 12 towards the lens switching apparatus 3. At this time, an objective lens is selected from among the objective lenses from 7a to 7f in response to the size of the region targeted for repair and the type of processing for the work piece 11. Then, the lens holder 6 is driven in the X-direction by driving the linear motor table 5 to control the position of the lens holder 6 in the X-direction. This can place the selected objective lens 7, for example, objective lens 7c, in the light path of the laser light 12. Because of this, the laser light 12 is concentrated by the objective lens 7c and focuses on the surface of the work piece 11.

When positional shifting occurs in the position of the objective lens 7c, at first, the position of the objective lens 7c in the Y-direction is adjusted to cancel the positional shifting in the Y-direction by rotating the lens housing 9 with respect to the lens holder main body 8. At this time, the position of the objective lens 7c shifts in the X-direction due to the rotation of the lens housing 9 and it is inevitable that the positional shifting that follows the rotation of the lens housing 9 will overlap the original positional shifting in the X-direction. Next, the positional shifting in the X-direction is cancelled by adjusting the moving amount of the linear motor table 5. During this adjustment the positional shifting in the X-direction caused by the rotation of the lens housing 9 is also cancelled at the same time. Because of this, the positional shifting of the objective lens 7c can be cancelled.

When the magnification of the objective lens 7 changes, the linear motor table 5 is driven once again moving the lens holder 6 in the X-direction and placing the selected objective lens 7 in the light path of the laser light 12. Because of this, one of the objective lenses 7 to be used can be switched.

Next, the effect of the embodiment will be described. In this embodiment, by arranging a plurality of objective lenses 7 in a straight line, and driving the linear motor table 5 to linearly move the lens holder 6, one of the objective lenses 7 to be used can be switched. Consequently, positioning of the objective lenses 7 can theoretically be achieved with an accuracy of linear scale resolution of the linear motor table 5 in the X-direction. Therefore, the positioning accuracy of the objective lenses 7 is high.

Furthermore, because the lens switching apparatus according to this embodiment uses a linear motor table, it is different from a conventional rotating type lens switching apparatus and is not equipped with a gear wheel. Because of this, positional shifting due to backlash and friction of the gear wheel does not occur.

Even further, even if positional shifting occurs in the objective lenses 7, that positional shifting will be in a straight orbital path, thereby making it easy to cancel the positional shifting compared to positional shifting in a circular path. In other words, in this embodiment initially the positional shifting in the Y-direction is cancelled by rotating the lens housing 9 and then the positional shifting in the X-direction is cancelled by adjusting the moving amount of the linear motor table 5. Even if the moving amount of the linear motor table 5 is adjusted, new positional shifting in the Y-direction will not occur. Therefore, positional shifting of the objective lenses 7 can be easily cancelled with high accuracy by adjusting the position in the Y-direction and adjusting the position in the Y-direction each one time. As a result, the adjustment time can be greatly shortened. In addition, since a special mechanism to cancel positional shifting in the X-direction is not required, the composition of the lens switching apparatus can be simplified.

In this embodiment, although an example was shown in which a lens switching apparatus was installed in a laser repair apparatus, the present invention is not limited to this and the lens switching apparatus can be installed in a laser inspection apparatus that only performs inspections on semiconductor devices or liquid crystal display devices. Because of this, the switching time of the objective lenses can be particularly shortened in operations that frequently switch objective lenses, thereby making it possible to improve the productivity. The present invention can also be used in ordinary microscopes as well. The member switching apparatus according to the present invention is not limited to a lens switching apparatus but can also be applied to a switching apparatus for tools of a machining center as well as a part insertion machine.

The present invention can be ideally applied to a laser repair apparatus that repairs semiconductor devices or liquid crystal display devices as well as a laser inspection apparatus that inspects these devices.

What is claimed is:

1. A member switching apparatus comprising:
   a plurality of members which can act on an object to be worked on by being positioned at a fixed position with respect to the object to be worked on;
   a plurality of housings, at least one of the plurality of housings having one of the plurality of members fixedly mounted therewithin such that a rotational axis of the at least one housing is offset from an optical axis of the member mounted therewithin;
   a holder that arranges the plurality of housings in a row, wherein the at least one housing is rotatable about its rotational axis; and
   a linear motor table that positions one of the members from among the plurality of members at the fixed position by moving the holder with respect to the object to be worked on in a direction in which the plurality of housings are arranged.

2. A lens switching apparatus placed between a light source and an object to be worked on illuminated by light emitted from the light source, comprising:
   a plurality of lenses;
   a plurality of lens housings each holding one of the plurality of lenses, at least one of the plurality of housings having one of the plurality of lenses fixedly held therewithin such that a rotational axis of the at least one housing is offset from an optical axis of the lens held therewithin;
   a holder that holds the plurality of lens housings in a row such that the optical axes of the plurality of lenses are arranged parallel to each other; and
   a linear motor table that positions one of the lenses from among the plurality of lenses in an optical path of the light by moving the holder in a direction in which the plurality of lenses are arranged;
   wherein of the at least one lens housings is held by the holder such that the at least one lens housing is rotatable about its rotational axis.

3. The lens switching apparatus according to claim 2, wherein:
   the rotational axis of the lens at least one housing is parallel to the optical axis of the lens held therewithin, such that a rotation of the at least one lens housing shifts a position of the lens held therewithin in a direction normal to the optical axis of the lens.

4. A laser repair apparatus that repairs parts processed using laser light, comprising:
   a laser oscillator;
   a table on which an object to be processed is disposed; and
   a lens switching apparatus disposed between the laser oscillator and the object to be processed, wherein
   the lens switching apparatus comprises:
      a plurality of lenses;
      a plurality of lens housings, each holding one of the plurality of lenses, wherein at least one of the plurality of lens housings has a lens fixedly held therewithin such that a rotational axis of the at least one lens housing is offset from an optical axis of the lens held therewithin;
      a holder that holds the plurality of lens housings in a row such that the optical axes of the plurality of lenses are arranged parallel to each other; and
      a linear motor table that positions one of the lenses from among the plurality of lenses in an optical path of the light by moving the holder in a direction in which the plurality of lenses are arranged;
   wherein the at least one lens housing is held within the holder such that it is rotatable about its rotational axis.

5. The laser repair apparatus according to claim 4, wherein:
   the rotational axis of the lens at least one housing is parallel to the optical axis of the lens held therewithin, such that a rotation of the at least one lens housing shifts a position of the lens held therewithin in a direction normal to the optical axis of the lens.

6. A laser inspection apparatus that inspects an object to be inspected using laser light, comprising:
   a laser oscillator;
   a table on which an object to be inspected is disposed; and
   a lens switching apparatus disposed between the laser oscillator and the object to be inspected, wherein
   the lens switching apparatus comprises:
      a plurality of lenses;
      a plurality of lens housings, each holding one of the plurality of lenses, at least one of the plurality of lens housings having a lens fixedly held therewithin such that a rotational axis of the at least one lens housing is offset from an optical axis of the lens held therewithin;

a holder that holds the plurality of lens housings in a row such that the optical axes of the plurality of lenses are arranged parallel to each other; and a linear motor table that positions one of the lenses from among the plurality of lenses in an optical path of the light by moving the holder in a direction in which the plurality of lenses are arranged;

wherein the at least one lens housing is held within the holder such that it is rotatable about its rotational axis.

7. The laser inspection apparatus according to claim 6, wherein:

the rotational axis of the lens at least one housing is parallel to the optical axis of the lens held therewithin, such that a rotation of the at least one lens housing shifts a position of the lens held therewithin in a direction normal to the optical axis of the lens.

* * * * *